United States Patent
Rapp

(10) Patent No.: US 10,177,522 B2
(45) Date of Patent: Jan. 8, 2019

(54) PUMP POWER MODULATION IN A FEED-FORWARD CONTROL FOR SUPPRESSING POWER TRANSIENTS

(71) Applicant: Xieon Networks S.a.r.l., Senningerberg (LU)

(72) Inventor: Lutz Rapp, Deisenhofen (DE)

(73) Assignee: Xieon Networks S.à.r.l., Senningerberg (LU)

( * ) Notice: Subject to any disclaimer, the term of this patent is extended or adjusted under 35 U.S.C. 154(b) by 0 days.

(21) Appl. No.: 15/512,728

(22) PCT Filed: Aug. 21, 2015

(86) PCT No.: PCT/EP2015/069235
§ 371 (c)(1),
(2) Date: Mar. 20, 2017

(87) PCT Pub. No.: WO2016/050416
PCT Pub. Date: Apr. 7, 2016

(65) Prior Publication Data
US 2017/0294757 A1    Oct. 12, 2017

(30) Foreign Application Priority Data
Sep. 30, 2014    (EP) .................................. 14187093

(51) Int. Cl.
*H01S 3/00*        (2006.01)
*H01S 3/067*       (2006.01)
(Continued)

(52) U.S. Cl.
CPC .......... *H01S 3/06758* (2013.01); *H01S 3/067* (2013.01); *H01S 3/06754* (2013.01);
(Continued)

(58) Field of Classification Search
CPC ........... H01S 3/06758; H01S 3/094011; H01S 3/067; H01S 3/10; H01S 3/13
(Continued)

(56) References Cited

U.S. PATENT DOCUMENTS 5,892,616 A    4/1999   Takahashi
2004/0017603 A1   1/2004   Jay et al.
(Continued)

FOREIGN PATENT DOCUMENTS

EP    2320582 A1    5/2011

OTHER PUBLICATIONS

Na et al, A Cost-Effective Gain Control Using Pump Modulation for Erbium-Doped Fiber Amplifiers, Apr. 2000, IEEE Photonics Technology Letters, vol. 12, No. 4, pp. 383-385 (Year: 2000).*

(Continued)

*Primary Examiner* — Mark Hellner
(74) *Attorney, Agent, or Firm* — Nelson Mullins Riley & Scarborough LLP

(57) ABSTRACT

Disclosed is a method of Controlling a gain of an optical amplifier comprising a gain medium and at least one pumping device. The method comprises the following steps: determining or predicting a change of input signal power to the amplifier, changing the pump power from an initial pump power level to a new pump power level at a first time instant, the initial pump power level being the pump power level applied to the amplifier prior to the change in input signal power, setting the pump power to a second pump power level at a second time instant, wherein the pump power level is varied in an oscillatory manner for at least one period of time starting at a third time instant and ending at a fourth time instant, wherein said third time instant is identical with (Continued)

Figure 1:
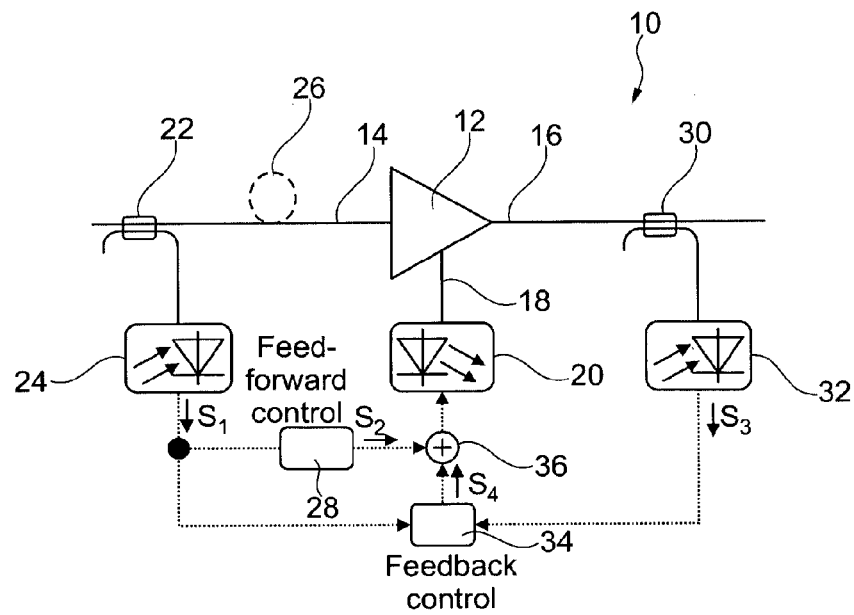

or later than said first time instant and said fourth time instant is identical with or earlier than said second time instant.

15 Claims, 11 Drawing Sheets

(51) Int. Cl.
    *H01S 3/094*     (2006.01)
    *H01S 3/10*     (2006.01)
    *H01S 3/13*     (2006.01)
    *H04B 10/296*     (2013.01)
    *H01S 3/0941*     (2006.01)
    *H01S 3/16*     (2006.01)

(52) U.S. Cl.
    CPC .......... *H01S 3/094011* (2013.01); *H01S 3/10* (2013.01); *H01S 3/10015* (2013.01); *H01S 3/13* (2013.01); *H01S 3/1301* (2013.01); *H04B 10/296* (2013.01); *H01S 3/09415* (2013.01); *H01S 3/094076* (2013.01); *H01S 3/1608* (2013.01)

(58) Field of Classification Search
    USPC .......................................................... 359/337
    See application file for complete search history.

(56) References Cited

U.S. PATENT DOCUMENTS

| | | |
|---|---|---|
| 2004/0202468 A1 | 10/2004 | Harney |
| 2008/0204860 A1* | 8/2008 | Rapp .................... H04B 10/291 |
| | | 359/341.3 |
| 2010/0157415 A1 | 6/2010 | Okrog |

OTHER PUBLICATIONS

European Office Action, EP Application No. 09749070.0, dated Mar. 9, 2017, 3 pages.
International Search Report and Written Opinion, PCT/EP2015/069235, dated Dec. 3, 2015, 14 pages.
Nakaji, H. et al., "Superior high-speed automatic gain controlled erbium-doped fiber amplifiers," Optical Fiber Technology, vol. 9: 25-35 (2003).

* cited by examiner

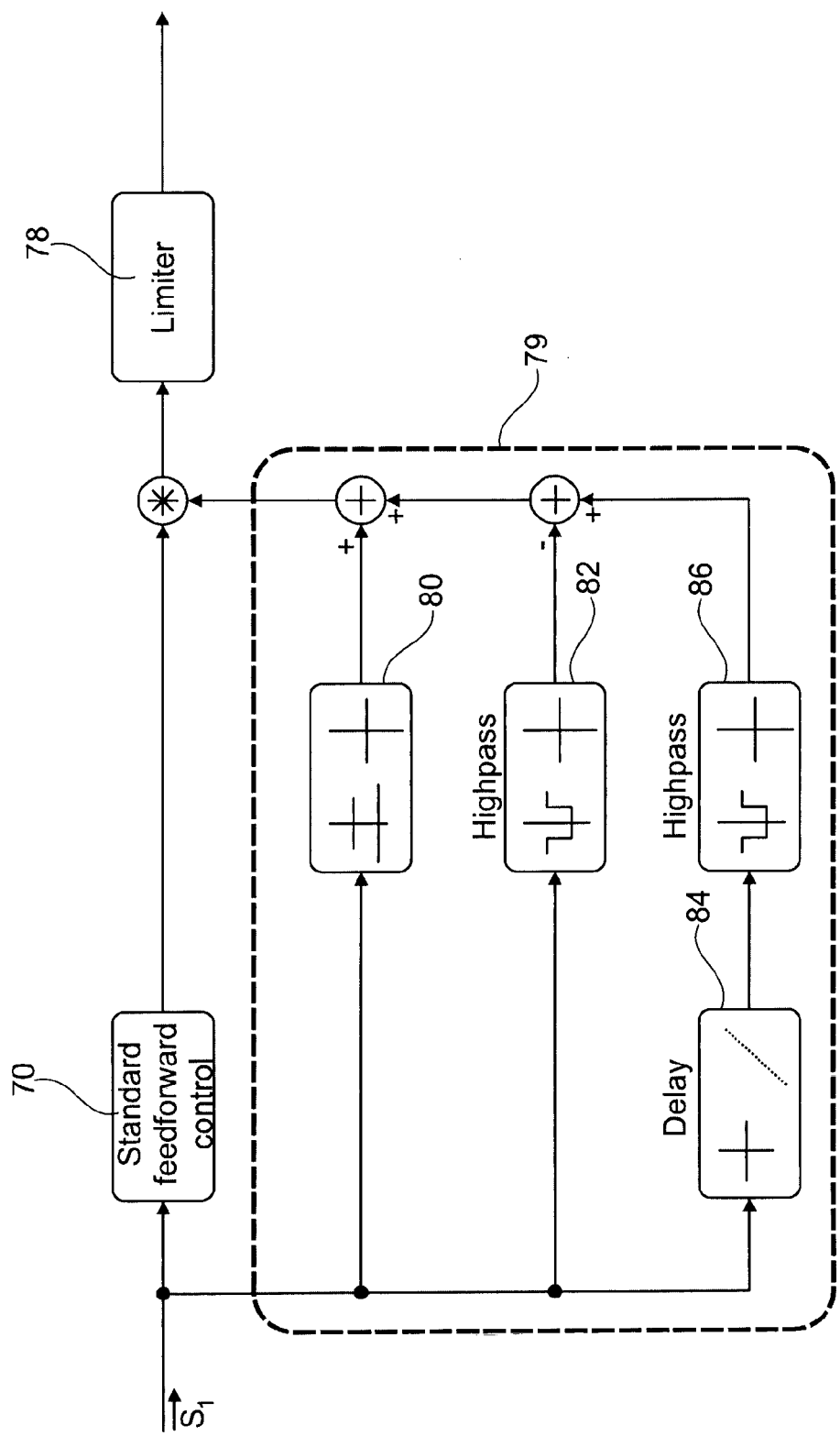

PUMP POWER MODULATION IN A FEED-FORWARD CONTROL FOR SUPPRESSING POWER TRANSIENTS

CROSS REFERENCE TO RELATED APPLICATIONS

This application is a 35 U.S.C. 371 national stage filing of International Application No. PCT/EP2015/069235, filed on Aug. 21, 2015, which claims priority to European Patent Application No. 14187093.1 filed on Sep. 30, 2014. The contents of the aforementioned applications are hereby incorporated by reference in their entireties.

FIELD OF THE INVENTION

The present invention is in the field of optical amplifiers. In particular, the present invention relates to a method of controlling an optical amplifier and a corresponding amplifier arrangement.

BACKGROUND OF THE INVENTION

Optical amplifiers are e.g. employed in the field of optical transmission technology for amplifying optical signals transmitted in optical networks. The optical signals in many cases propagate over hundreds of kilometers in an optical fiber and are consequently attenuated during propagation. Using fiber amplifiers, such as erbium-doped fiber amplifiers (EDFAs), the light signals can be amplified in the optical domain, i.e. without intermittent conversion to electrical signals to maintain sufficient signal strengths along the link in spite of the long transmission distance. In this way, a sufficient signal-to-noise ratio at the receivers is achieved.

However, particularly wavelength division multiplexing (WDM) networks suffer from sudden changes in optical power due to component failures, fiber breaks or protection switching. Another source of optical variations is the adding and dropping of optical channels in the WDM network for the purpose of routing of optical signals to their destination. Due to non-linear fiber effects and the non-ideal dynamic properties of fiber amplifiers, such as EDFAs, these changes can propagate to other sites leading to optical power fluctuation across the whole network and possibly to oscillations. Consequently, even wavelength channels that are not directly affected by the switching operations or failures can suffer from some performance degradation at the receivers. Such performance degradation is mainly due to the deviation from the dynamic range of the optical receivers, signal distortions induced by non-linear effects in the transmission fibers, and deterioration of the signal-to-noise ratio.

Furthermore, gain variations can also accumulate in a cascade of amplifiers. Thus, even small gain variations can result in significant power changes at the receivers. Consequently, efficient amplifier control techniques are required that allow to keep the inversion in the gain medium and as a consequence the gain profile of the amplifier or an amplifier stage relatively constant even if the input power changes.

Fast electronic control architectures are currently the most economical solution to stabilize the gain of EDFAs. Herein, typically feed-forward and feedback control techniques are combined. A feed-forward control allows for reacting quickly to input power changes and prevents large gain deviations, but some permanent variations are unavoidable due to inaccuracies of the underlying models, aging effects and intrinsic effects. These deficiencies are compensated by the much slower feedback system cleaning up for any error in the predetermined adjustment made in the feed-forward control and thus helping to recover the original gain of the amplifier, i.e. the gain of the amplifier prior to the sudden change in input power. This combination allows making the feed-forward control robust against aging effects and changing environmental conditions by continuously updating the control parameters during operation. On an again larger time scale, corrections can be made by the link control including the continuously running signal preemphasis.

In a standard control scheme, where a change in the input power to the amplifier is detected, the feed-forward control usually sets the pump power immediately to a new power level. In combination with the altered signal powers, this new pump power level is usually intended to lead to the same steady-state inversion level of the gain medium existing before the input power change. In order to achieve optimum results, the prediction of the new pump power level should be as accurate as possible and almost immediate. But in some cases, even this is not sufficient.

Even in the ideal case of immediate pump power adaption and accurate prediction of the required pump power, gain variations can usually not be avoided completely. This is particularly true for EDFAs which use at least one pump with an emission wavelength of around 980 nm. With this pump wavelength, the $Er^{3+}$ laser active dopant will be pumped from the gound state $^4I_{15/2}$ to the "third state" $^4I_{11/2}$. A relatively fast multi-phonon transition leads from the third state $^4I_{11/2}$ to the metastable state $^4I_{13/2}$, which has a lifetime depending on the glass composition on the order of 8 ms to 15 ms with a typical value of 10 ms. Due to the finite lifetime at the third state or energy level, transitions from the third energy level to the metastable state or second energy level are not adapted synchronously to a sudden reduction of the pump power due to the finite lifetime of this level, since, metaphorically speaking, some of the pump photons are stored at the third level. This gives rise to a memory effect that leads to a delayed reaction to control interactions causing intermediate gain variations. Such intermediate gain variations can in fact be large enough to strongly disturb data detection at the receivers. Due to the accumulation of gain variations in optical networks, as mentioned before, there is a strong need to keep gain variations as small as possible.

One way of suppressing transient dynamic gain fluctuations referred to as "input delay control" is disclosed in H Nakaji, Y Nakai, M Shigematsu, and M Nishimura, "Superior high-speed automatic gain controlled erbium-doped fiber amplifiers," Opt. Fiber Techn., vol. 9, no. 1, pp. 25-35, February 2003. Herein, it is proposed to delay the signal between an input monitor and the actual input to the first EDF of the amplifier in order to be in a position to adjust the pump power before the change of the input power to the gain medium actually occurs. However, the delay as proposed by Nakaji et al. requires an additional fiber having a length of at least 400 m. In addition to a small increase in noise, this additional fiber also requires larger amplifier housings for accommodating the fiber coil, contrary to the current trend towards smaller amplifier sizes.

An improved method of optical fiber amplifier control without any input delay is disclosed in EP 2 320 582 A1 by the present inventor. In this control method, when a power drop at the input of the amplifier is detected, the pump is switched off completely (or at least reduced to a power level close to zero) during a limited time period referred to as "zero period" in the present disclosure, in order to depopulate the third level of the $Er^{3+}$ ions more quickly.

While this "zero period technique" leads to a significant reduction of transient gain variations as a consequence of input power variations, still depending on circumstances, a need for even lower gain variation may arise. This is particularly true in cases where pump bypasses or pump splitters are employed for introducing pump power into two different rare earth doped fiber coils separated by an optical isolator.

SUMMARY OF THE INVENTION

Accordingly, a problem underlying the invention is to provide for a method of controlling an optical amplifier and an amplifier arrangement which allow for a further reduction of transient gain variations induced by a variation in input power.

This problem is solved by a method for controlling a gain of an optical amplifier according to claim 1 or claim 11 and an amplifier arrangement according to claim 13 or 14. Preferable embodiments are defined in the dependent claims.

According to one embodiment of the present invention, the method of controlling a gain of an optical amplifier comprising a gain medium and at least one pumping device comprises the following steps:
determining or predicting a change of input signal power that is inputted to the amplifier,
changing the pump power from an initial pump power level to a new pump power level at a first time instant, the initial pump power level being the pump power level applied to the amplifier prior to the change in input signal power,
setting the pump power to a second pump power level at a second time instant, wherein the pump power level is varied in an oscillatory manner for at least one period of time starting at a third time instant and ending at a fourth time instant, wherein said third time instant is identical with or later than said first time instant and said fourth time instant is identical with or earlier than said second time instant.

The present invention is particularly useful for amplifiers where the gain medium contains a third state or "pump state", to which the ions of the gain medium are pumped by the pumping device and which is higher in energy than the metastable state of the gain medium and which is to be depleted by non-radiative transitions. This is for example the case in EDFAs, where in addition to the ground state $^4I_{15/2}$ and the metastable state $^4I_{13/2}$, a third state $^4I_{11/2}$ of short lifetime is involved, to which at least some of the $Er^{3+}$ ions are actually pumped. While $Er^{3+}$ is currently the gain medium of most practical importance, the present invention is not limited to this but is also useful for other dopants involving pumping into an energy level that is higher than the energy level from which transitions contributing to signal amplification originate.

As will be explained below in more detail, if the change in input power is for example an input drop, then art overshoot in the gain can be decreased if a positive deviation of the population of the second state from its final value can be limited. Generally, this can be done by turning off the pump for some time and/or by reducing the pump power to the second level already prior to the actual drop in input power. However, the inventor has noticed that in many realistic applications, in particular those involving a pump bypass or a pump splitter, such smaller positive deviations in the population of the second state may lead to considerable undershoots in the gain which are likewise detrimental. In other words, using the prior art control techniques of limiting the gain overshoot will in many cases be at the price of the appearance of or the increase of an existing undershoot, thereby limiting the possible decrease in the absolute value of the gain variation. However, by applying an oscillating pump power level for a period of time prior to setting the pump power to the second power level, the population of the second stage can be pushed in small steps to larger values before moving to the final value, and the magnitude of the undershoot hence becomes smaller. This way, both, a small gain overshoot and a small gain undershoot can be achieved within the same control.

In a preferred embodiment, the time-average value of oscillating pump power exceeds the second pump power level.

Preferably, the ratio of the time average of the oscillating power level to the second power level is in a range of 1 to 10, preferably 2 to 4. Preferably, the duration of said at least one period of time in which the power level oscillates, or the accumulated duration of plural such periods is from 20 μs to 500 μs, preferably from 100 μs to 300 μs.

Note that this is conceptually very different from the "input delay" control or the "zero period" control referred to in the introductory portion above, which are concentrated predominantly on the first 10 or 20 μs around the change in input power, after which the second power level is constantly applied.

Preferably, the amplitude of the power level oscillation decreases with time.

In a preferred embodiment, the average frequency of the oscillation is larger than 1 kHz, preferably larger than 10 kHz and in particular larger than 200 kHz. In addition or alternatively, the average frequency of the oscillation is smaller than 1 GHz, preferably smaller than 100 MHz, and in particular smaller than 2 MHz.

Preferably, the second pump power level is chosen to drive the amplifier gain to a predetermined gain value, wherein said predetermined gain value preferably coincides with the gain value prior to the change in input power.

In a particularly important embodiment,
the change of input signal power comprises a drop of input signal power,
the second pump power level is smaller than said initial pump power level, and
the pump power is kept at or below a first pump power level for a period of time starting on or after said first time instant and ending prior to or at the third time instant, wherein said first pump power level is equal to or smaller than said second pump power level, and in particular zero.

Input power drops are the most critical examples of changes of input power, which may arise for example due to fiber breaks or protection switching, resulting in an abrupt and unforeseeable change in power at the input of the amplifier. For this reason, most of the discussion and the specific examples discussed below are related to input power drops. Nevertheless, the invention is not limited to this and a similar control is also applicable for cases where the input power increases, with appropriate values of the first and second input power levels. In this case, preferably
the change of input signal power comprises an increase of input signal power,
the second pump power level is larger than said initial pump power level, and
the pump power is kept at or above a first pump power level for a period of time starting on or after said first time instant and ending prior to or at the third time instant, wherein said first pump power level is larger than said second pump power level.

In a preferred embodiment, the first time instant coincides with a change of input power, or is at least no later than 10 µs, preferably 1 µs after the input power has changed by 50% of the total input power change.

This control may relate to a case where the input signal power is monitored directly at the input to the optical amplifier, more precisely to its gain medium, and where the pump power is changed immediately when the change of input power is detected. Since the electronic control circuitry involved, however, has a finite response time, a short delay between the input power change and the corresponding change in pump power in the range defined above is still permitted in this embodiment.

In an alternative embodiment, the first time instant is prior to the time at which the input power to the amplifier has changed by 50% of the total input power change. In particular, the first point in time may precede the time at which the input power to the amplifier has changed by 50% of the total power change by at least 0.1 µs, preferably by at least 0.5 µs and/or 10 µs or less, preferably 2 µs or less. Herein, the input power is preferably monitored at a location that is separated from the gain medium of the amplifier by an optical delay element.

In a preferred embodiment, the amplifier is a fiber amplifier, and the gain medium is formed by a rare earth dopant in the fiber, and in particular an erbium dopant.

Preferably, the pump device has an emission wavelength of 980 nm+/−10 nm.

A pump wavelength around 980 nm allows for populating the third level of the $Er^{3+}$ dopant. As will be explained in more detail below, the involvement of a third level in the gain medium makes the gain control somewhat more complicated, and one could be tempted to rather use a pump wavelength around 1480 nm for directly populating the second or metastable state. However, in the technical field, the currently available pump sources operating at 980 nm are currently superior with regard to maximum output power, costs and resulting noise performance, so that preferred pumping devices will often include at least one 980 nm light source.

In a preferred embodiment, the amplifier comprises two rare earth doped fiber-lengths, typically fiber coils, particularly erbium doped fiber-coils, separated by an optical isolator and comprising a pump bypass allowing the pump light to bypass said isolator, or a splitter for splitting the light of the pumping device for introduction in the individual fiber-lengths.

Herein, the optical isolator between the two fiber-lengths serves to limit backward propagating amplified spontaneous emission (ASE). Using the pump bypass or the pump splitter, light from the same pumping device can be introduced to both fiber-lengths. However, the inventor observed that when employing a pump bypass there is a tendency of gain undershoots to occur. This tendency is also expected to be present for pump splitting approaches. Using the gain control of the present invention, however, this undershoot can be successfully suppressed, as will be demonstrated in more detail below.

In an alternative embodiment, the method of controlling a gain of an optical amplifier comprises the following steps:
determining or predicting a change of input signal power to the amplifier,
changing the pump power from an initial pump power level to a new pump power level at a first time instant,
the initial pump power level being the pump power level applied to the amplifier prior to the change in input signal power,
setting the pump power to a second pump power level at a second time instant, wherein in case the change of input signal power is a drop in input signal power,
the pump power is kept at or below a first pump power level during a first time interval starting after said first time instant, wherein said first pump power level is lower than said second pump power level, and in particular zero, and
the pump power is raised above said second pump power level during a second time interval, said second time interval starting after said first time interval has ended and ending at or prior to said second time instant, and/or in case the change of input signal power is an increase in input signal power,
the pump power is kept above a first pump power level during a first time interval starting after said first time instant, wherein said first pump power level is larger than said second pump power level, and
the pump power is kept below said second pump power level during a second time interval, said second time interval starting after said first time interval has ended and ending at or prior to said second time instant.

As will be shown below with reference to an example embodiment, this type of control also allows to decrease the total gain variation to values lower than those of the prior art feed-forward controls. In this case too, the first time instant, at which the pump power is first changed, may be prior to the time at which the input signal power to the amplifier has changed by 50% of the total input signal power change.

Also, during said second time interval, the pump power may be adjusted such as to monotonically converge to said second pump power level. In this case, the time at which the pump power level reaches the second pump power level is then regarded as the "second time instant" according to this embodiment. In case that the pump power asymptotically converges to the second pump power level, the second time instant may for example be the time at which the pump power level is within 3% of the second pump power level.

SHORT DESCRIPTION OF THE FIGURES

Figure 2:
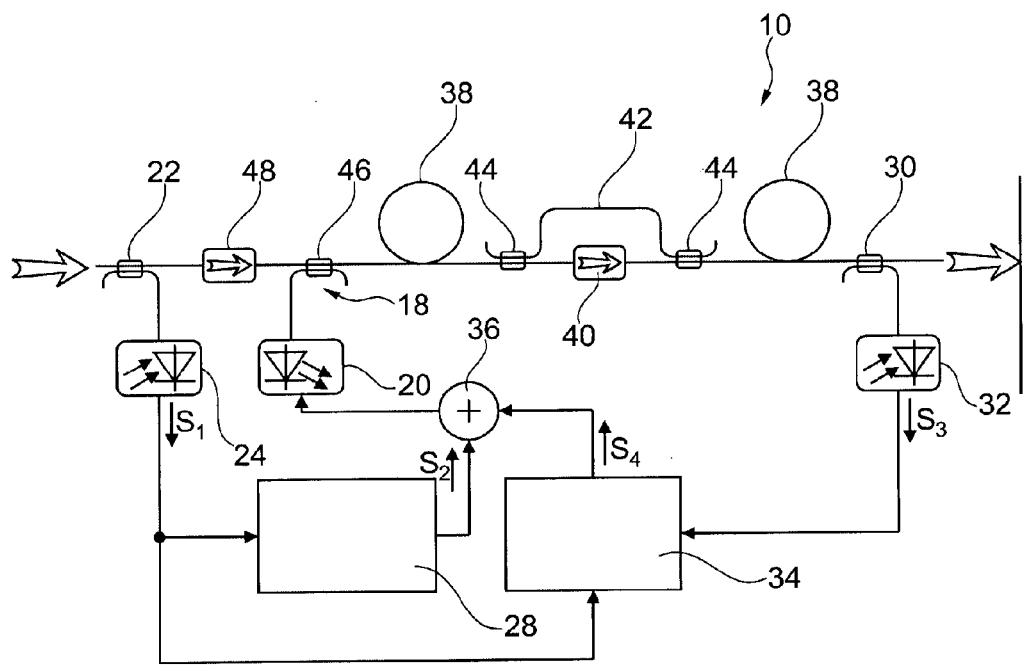
Figure 3:
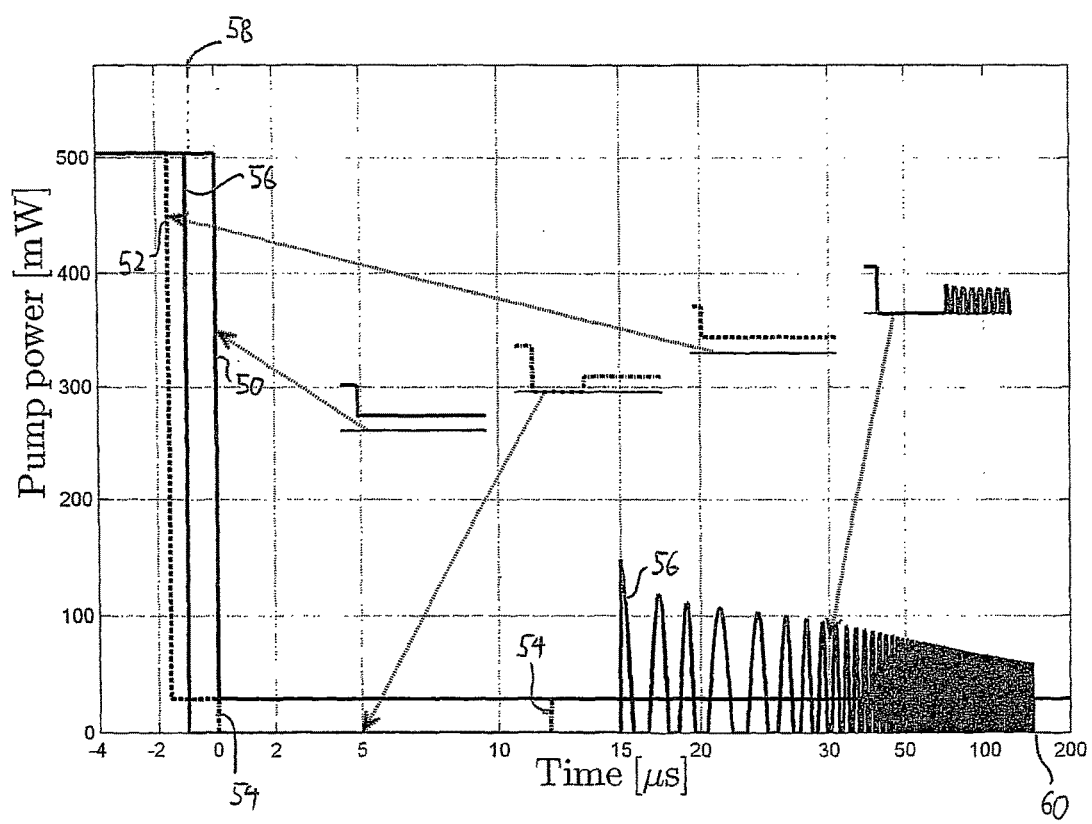
Figure 4:
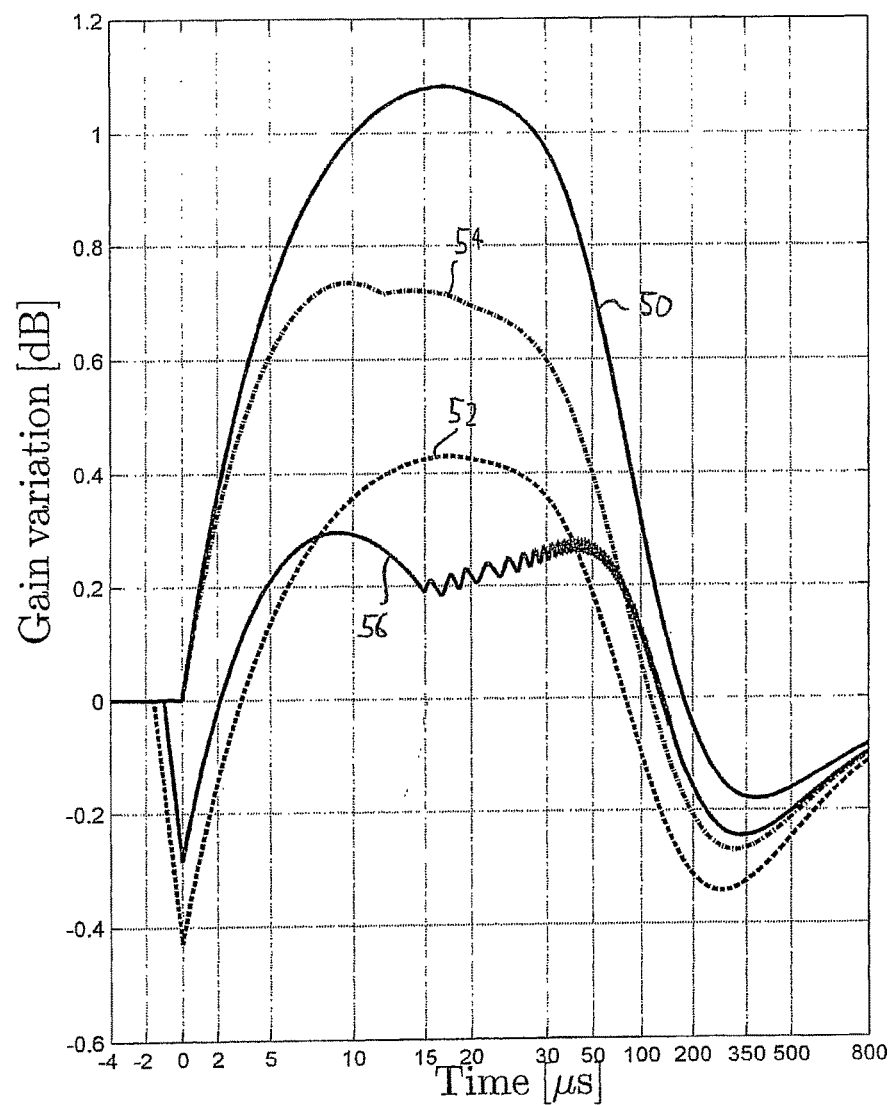
Figure 5:
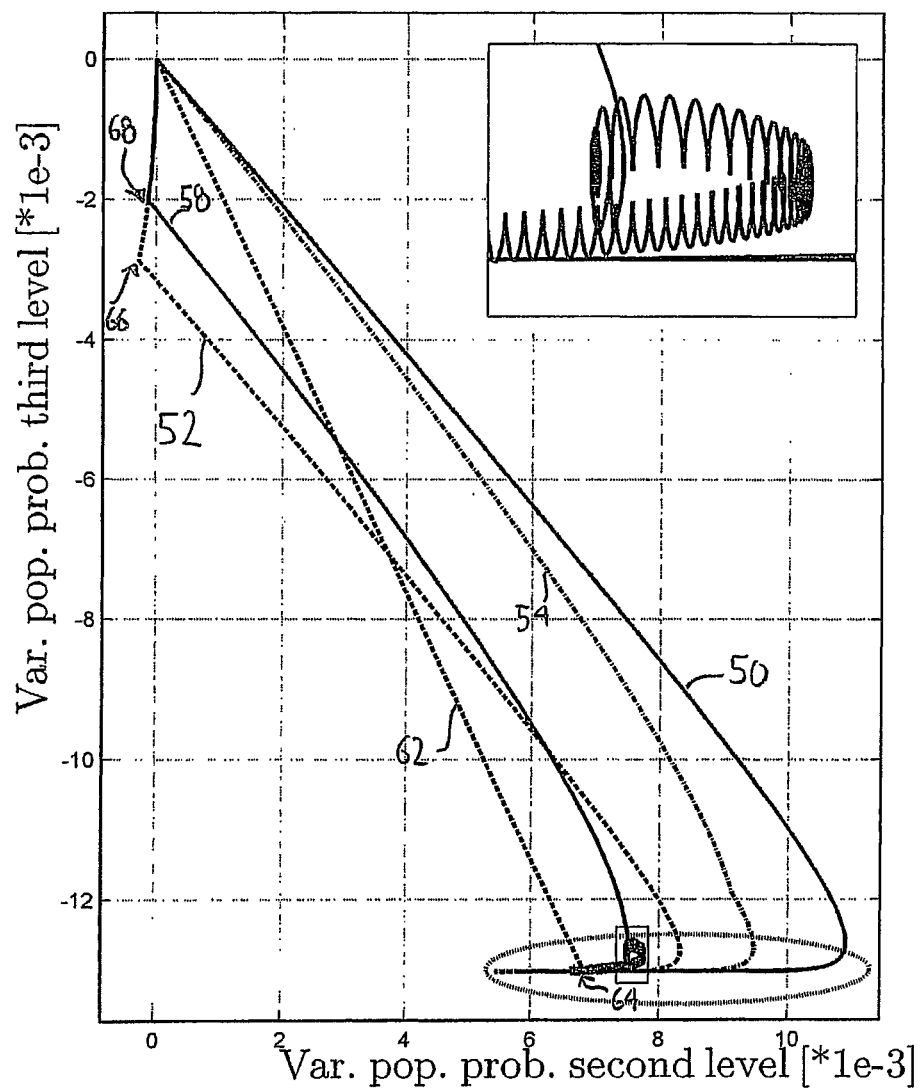
Figure 6:
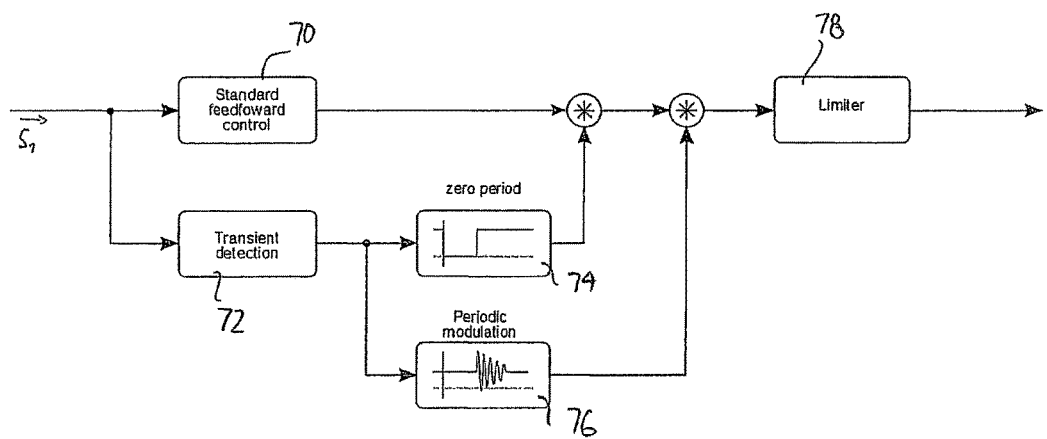
Figure 7:
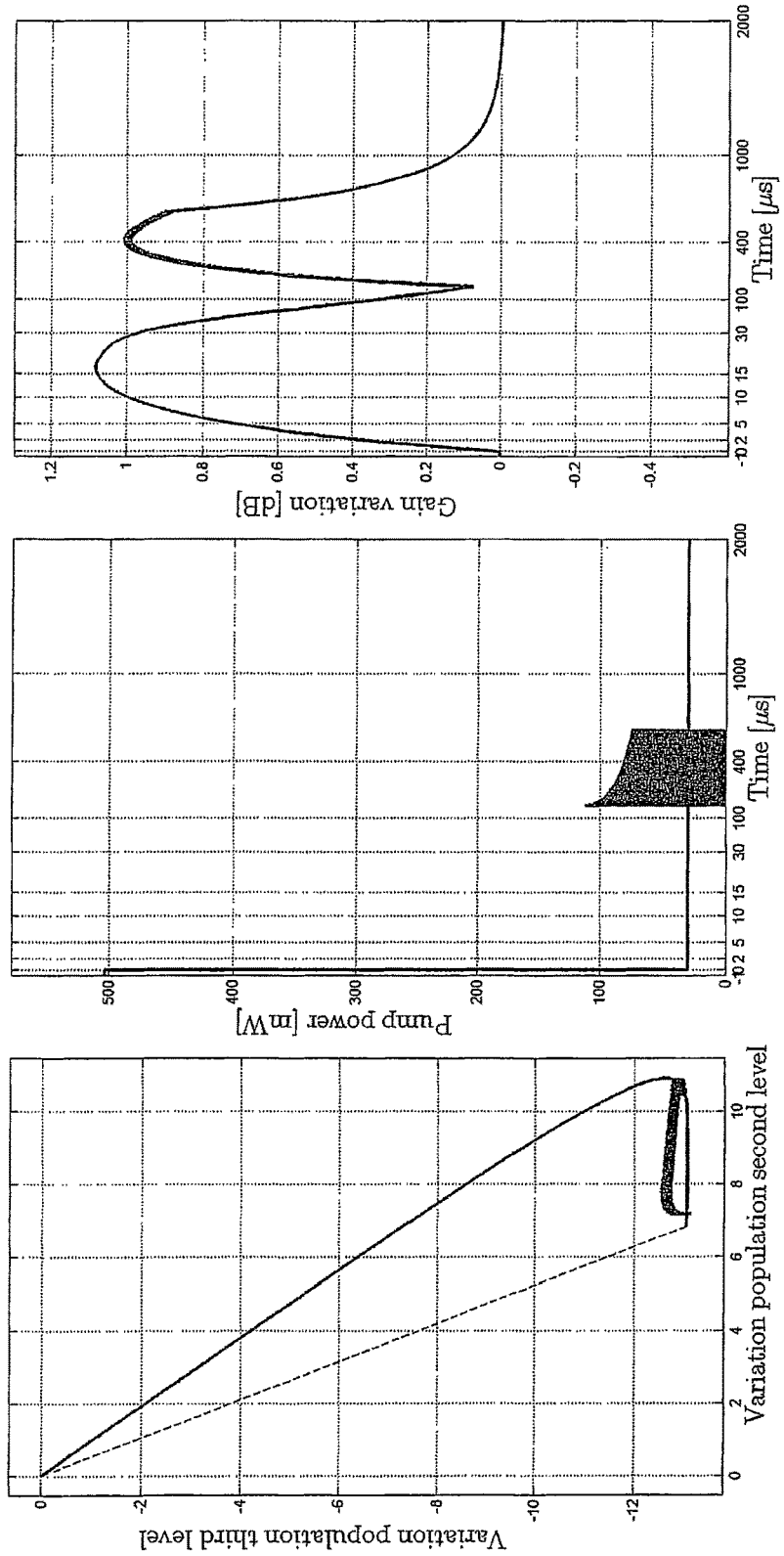
Figure 8:
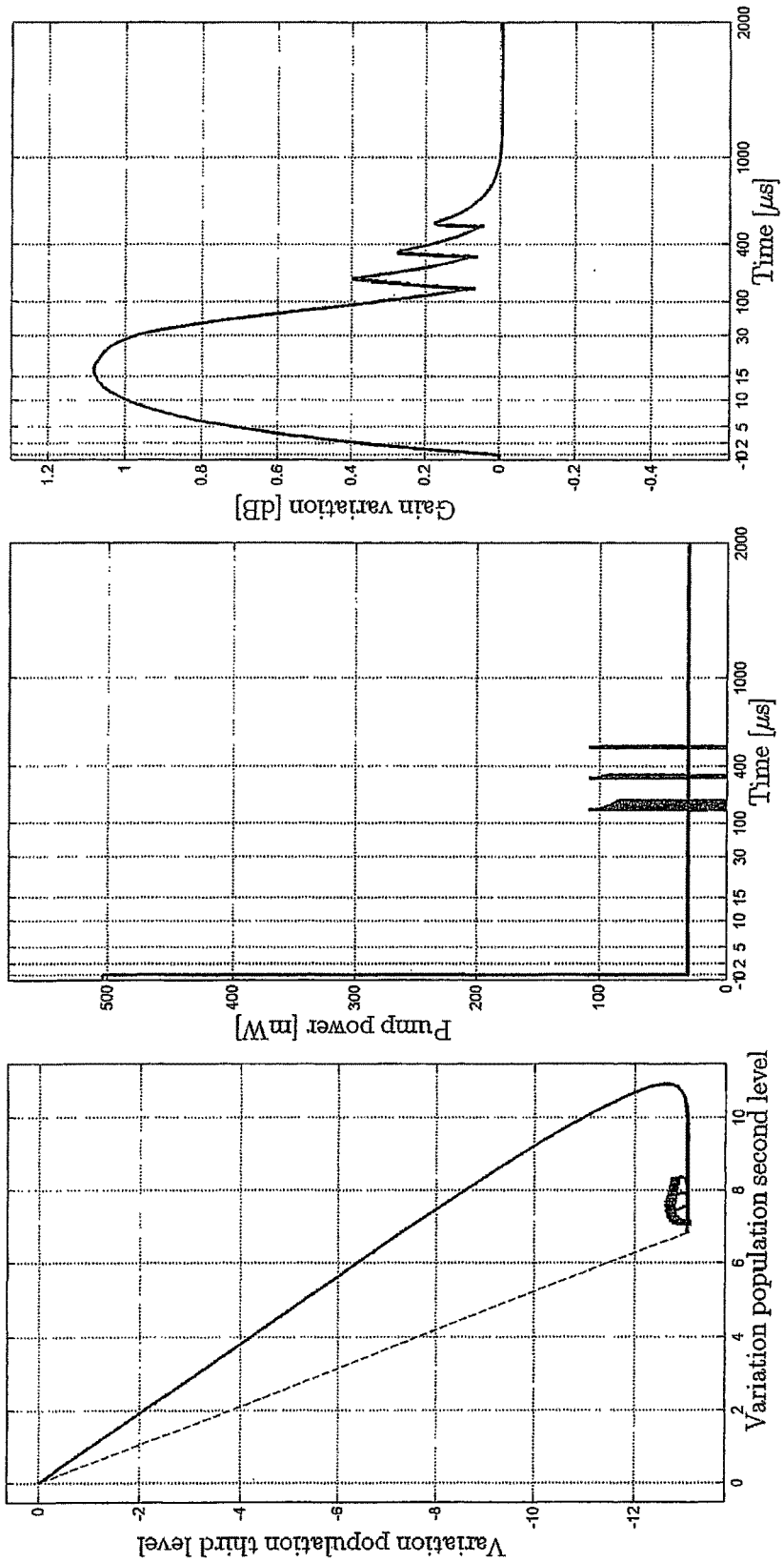
Figure 9:
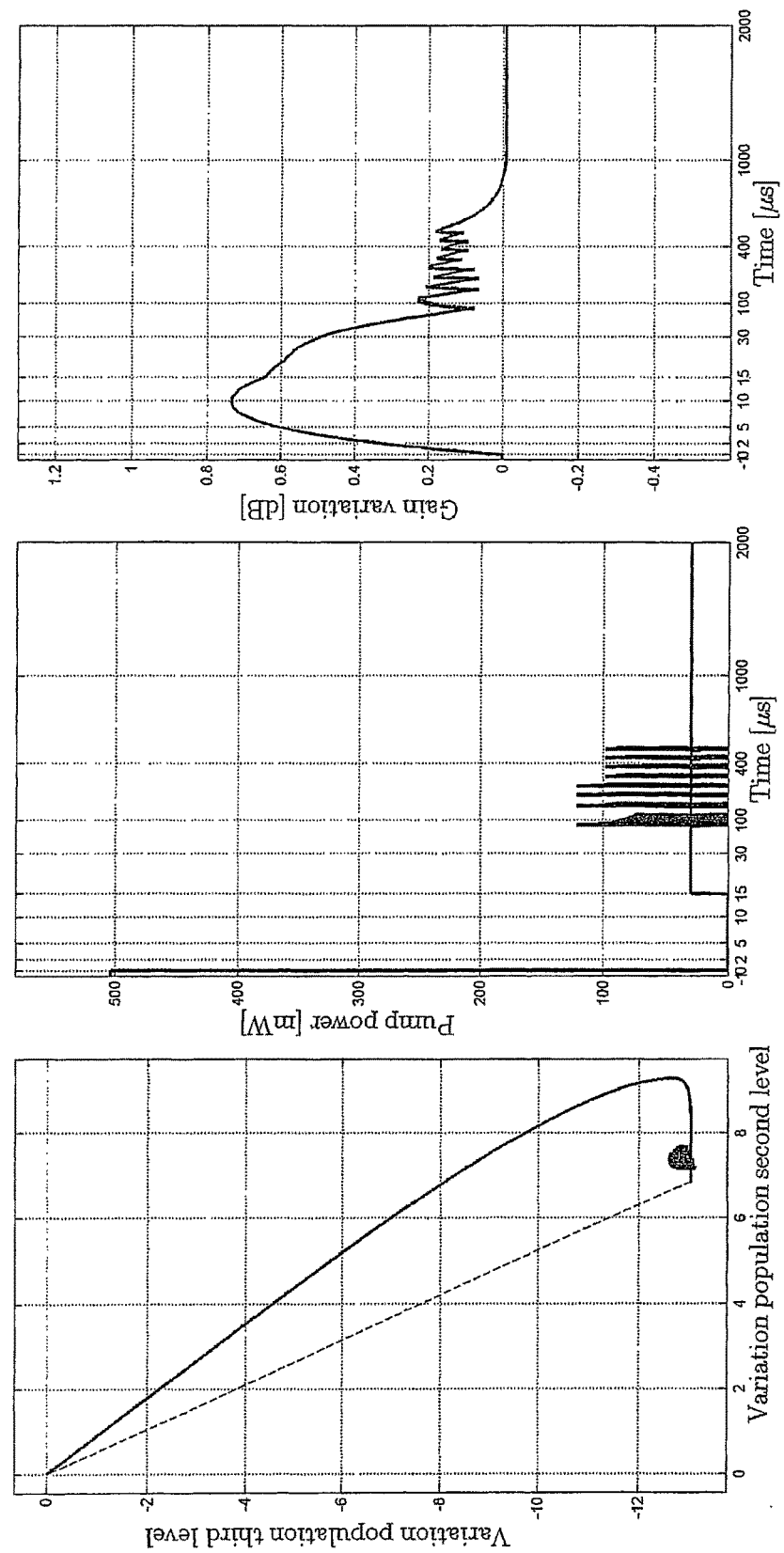
Figure 10:
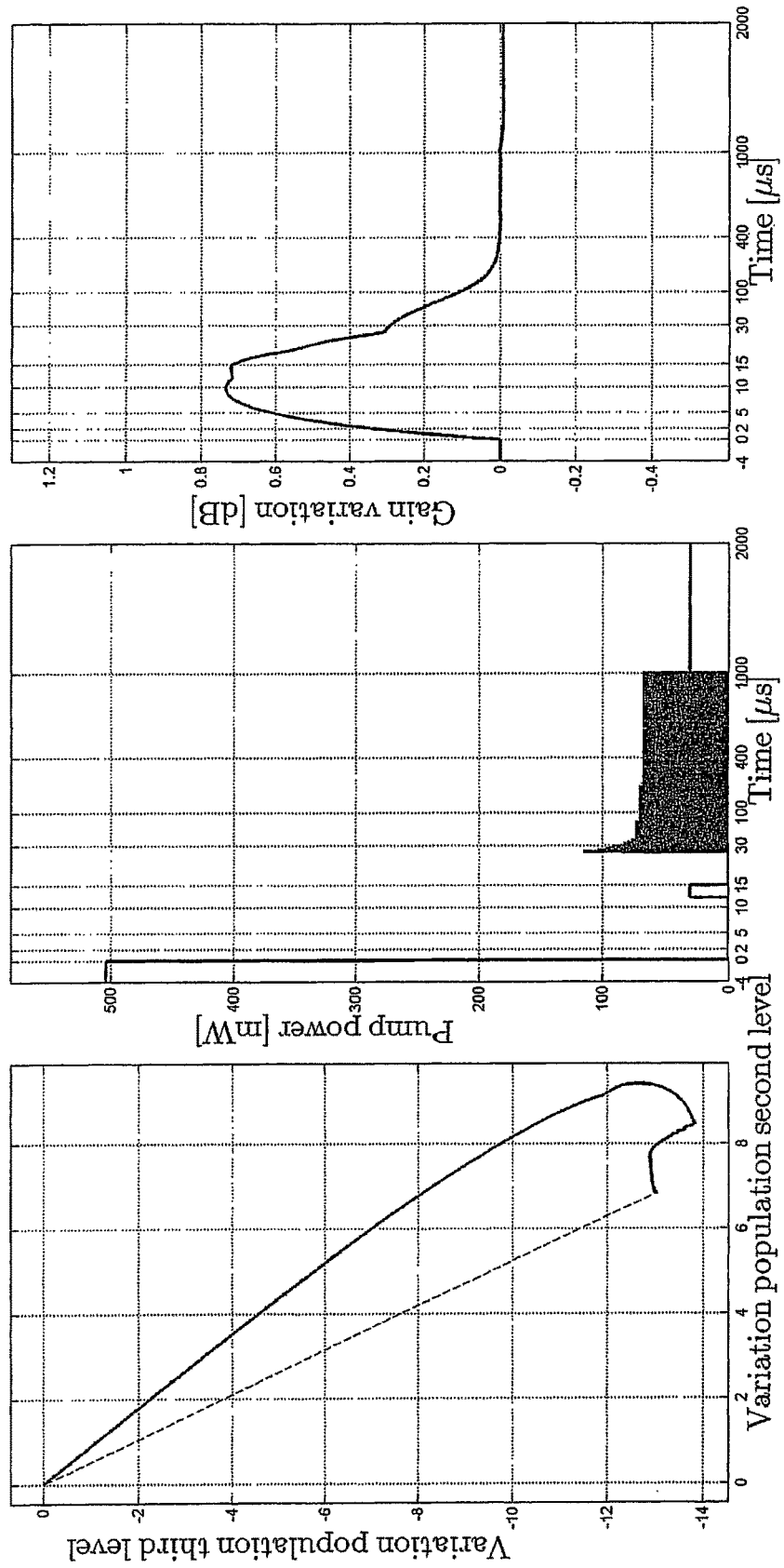
Figure 11:
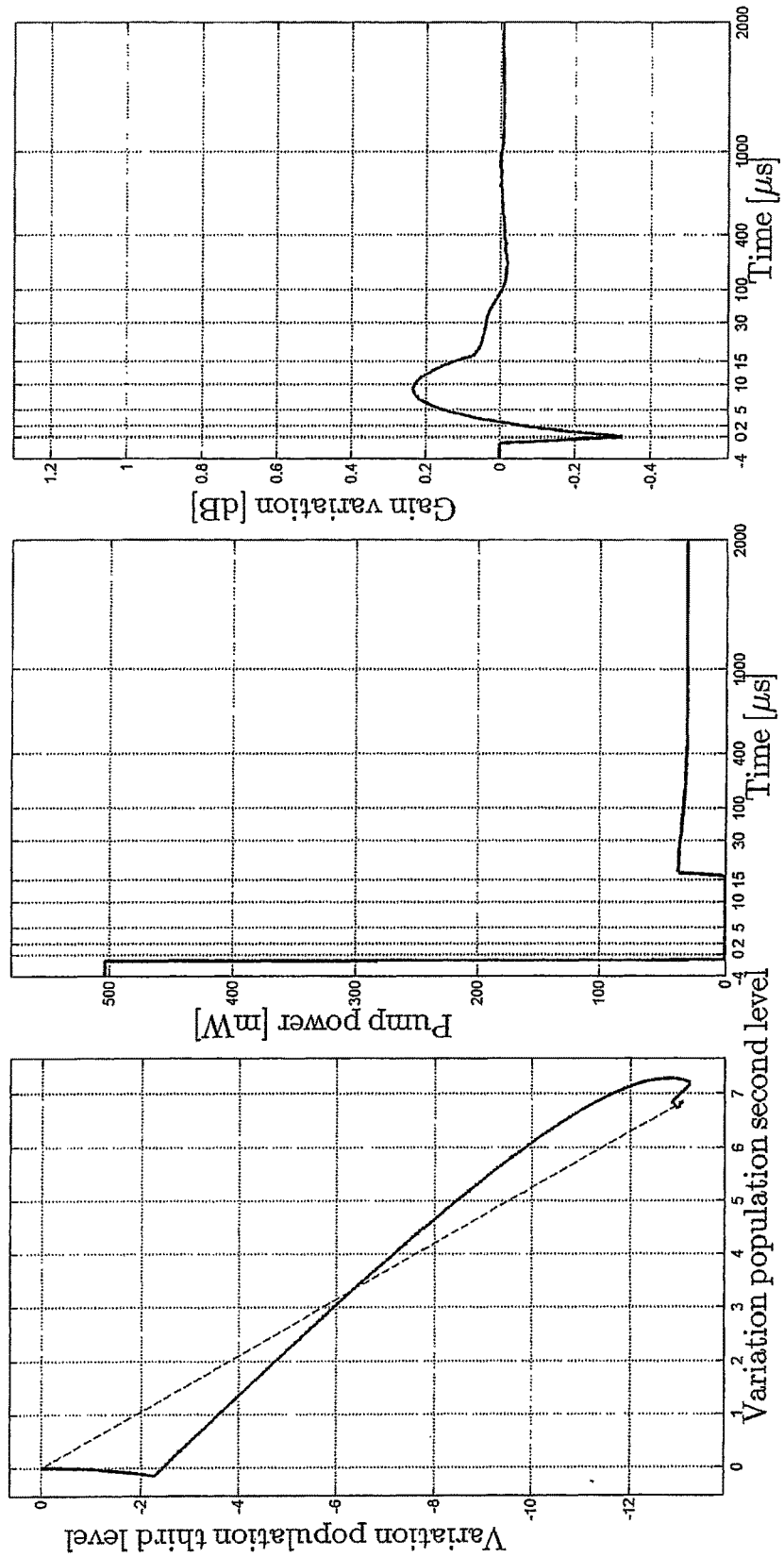

FIG. 1 is a schematic illustration of an amplifier setup according to an embodiment of the invention, FIG. 2 is a further schematic illustration of an amplifier setup, in which the arrangement of passive components and doped fibers of FIG. 1 is shown in more detail, FIG. 3 is a graph showing the pump power versus time for the pump power control of the invention and three examples of pump power control according to prior art, FIG. 4 shows the gain variation versus time obtained with the pump power control schemes shown in FIG. 3, FIG. 5 is a parametric plot of the variation of the population of the second and third level of the gain medium obtained for the four control schemes of FIG. 3, FIG. 6 is a block diagram illustrating the pump power control according to an embodiment of the invention, FIG. 7 shows a parametric plot of the variation of the population of the second and third levels, a pump power versus time and a gain variation versus time for an example using an oscillating pump power without input delay and without zero period, FIG. 8 shows a parametric plot of the variation of the population of the second and third levels, a pump power versus time and a gain variation versus time for an example using three separate intervals of oscillating pump power without input delay and without a zero period, FIG. 9 shows a parametric plot of the variation of the population of the second and third levels, a pump power versus time and a gain variation versus time for an example using eight separate intervals of oscillating pump power in combination with zero period, but without input delay, FIG. 10 shows a parametric plot of the variation of the population of the second and third levels, a pump power versus time and a gain variation versus time for an example using a single extended interval of oscillating pump power in combination with a zero period, but without input delay, FIG. 11 shows a parametric plot of the variation of the population of the second and third levels, a pump power versus time and a gain variation versus time for an alternative embodiment, in which an input delay and a zero period are combined with raising the pump power above a second pump power level during a second time interval starting after the zero period, and FIG. 12 is a block diagram showing a filter arrangement for generating the control signal for the control method employed in the example of FIG. 11.

PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device and method and such further applications of the principles of the invention as illustrated therein being contemplated therein as would normally occur now or in the future to one skilled in the art to which the invention relates.

In FIG. 1, setup 10 of an erbium-doped fiber amplifier (EDFA) is schematically shown. The setup 10 comprises an arrangement 12 of passive components and erbium-doped fibers, which in FIG. 1 is represented by an amplifier symbol. The arrangement 12 has an input 14 for incoming light to be amplified, an output 16 for the amplified light and a pump-light input 18 for receiving a pump-light generated by a pump-light source 20. In the present example embodiment, the pump-light source 20 has a pump wavelength of 980 nm.

Upstream of the amplifier input 14, a power splitter 22 is provided, which branches off some of the incoming light and leads it to an optical-electrical converter 24, which in the present example is formed by a photodiode. Between the power splitter 22 and the input of the EDFA 12, an optional delay line 26 is provided, which is illustrated by a dashed line to indicate that it is an optional feature only.

The photodiode 24 generates an electrical signal $S_1$ representing the input power that is inputted to the arrangement 12 with or without delay, depending on whether the delay line 26 is present or not. The input power signal $S_1$ is inputted into a feed-forward control unit 28 which outputs a pump power signal $S_2$ representing a pump power to be provided by the pump light source 20.

Downstream of the output 16 of the arrangement 12, a second power splitter 30 and a second optical-electrical converter 32 are provided. In the present example, the optical-electrical converter is again formed by a photodiode.

The second photodiode 32 generates an output power signal $S_3$ which represents the power of the light signal outputted by the arrangement 12. Both, the input power signal $S_1$ and the output power signal $S_3$ are fed to a feedback control unit 34 which in response to these signals generates a signal $S_4$ which can be regarded as a correction to the pump power signal $S_2$, and which is combined with the pump power signal $S_2$ in an adder 36. The purpose of the feedback control performed by the feedback control unit 34 is mainly to correct for long term effects, while the present invention is mainly concerned with a feed-forward control provided by the feed-forward control unit 28.

In FIG. 2, an example of the amplifier arrangement is shown in which the arrangement 12 is shown in more detail. As is seen therein, the arrangement 12 comprises two coils of erbium-doped fibers 38 separated by an optical isolator 40. The optical isolator 40 is bypassed by the remaining pump light of the first coil via a pump bypass 42 coupled with the ends of the erbium-doped fiber coils 38 via wavelength selective couplers 44. As is further seen in FIG. 2, the pump light input 18 is connected to the first fiber coil by a further wavelength selective coupler 46. Finally, a further isolator 48 separates the splitters 22 and 46 and thus avoids that backward travelling ASE exits the amplifier at its input.

FIG. 3 is a diagram showing the pump power versus time according to the feed-forward control of the present invention and in comparison to prior art feed-forward controls. Note that in FIG. 3, the time axis has a non-linear scale in order to clearly distinguish the differences between the different control schemes around time zero. It is assumed that at time zero, the input signal power to the amplifier 12 drops significantly.

In the standard feed-forward control, which is represented by the solid curve 50 in FIG. 3, the pump power drops from an initial pump power level to a second pump power level in a single rapid drop at time zero. The initial pump power level is adapted to the initial input power, i.e. prior to the power drop, such that a predetermined gain value is obtained. The second pump power level is a power level which is adapted to the new input signal power value such as to obtain the same gain of the amplifier 12 as before. Clearly, if the input signal power to the amplifier 12 drops, as in the present case, a reduced pump power is needed in order to obtain the same gain value, or, in other words, the same ratio of the populations of the ground state and the metastable state of the $Er^{3+}$ ions in the erbium-doped fibers 38 (see FIG. 2). Consequently, the second pump power level is considerably smaller than the initial pump power level.

Further in FIG. 3, the pump power versus time is shown for the feed-forward control based on an input delay in the dashed line 52. According to the "input delay control", the pump power drops from the initial pump power level to the second pump power level before the input power to the gain medium-embedded in the arrangement 12 actually drops, which is why the drop of the dashed line 52 in FIG. 3 is at negative times. Since in the most critical cases, such as component failures or fiber breaks, the drop in input power cannot be foreseen, a delay line like the delay line 26 in FIG. 1 is provided between the optical-electrical converter 24 for monitoring the input drop and the input 14 to the arrangement 12. Therefore, this control scheme is hereafter referred to as "input delay control".

Further shown in FIG. 3 is the "zero period control" known from the inventor's earlier patent application EP 2 320 582 A1. The corresponding curve in the diagram of FIG. 3 is shown in the chain dotted line 54. Like the standard control, in the "zero period control" the pump power is reduced immediately when the drop in input power is noticed, i.e. at time zero. However, in the "zero period control" the pump power is actually reduced to zero, or at least to some value that is below the second pump power level. The pump power is kept at this low or vanishing value for a certain period of time after which it is set to the second pump power level. A derivation of suitable durations for the zero period is provided in EP 2 320 582 A1 and incorporated herein by reference.

Finally, a further solid curve 56 in FIG. 3 represents the pump power versus time according to the feed-forward control of an embodiment of the present invention. The control according to this embodiment of the invention is referred to as "modulated pump power control" in the following. In the modulated pump power control, at a first time instant 58 the pump power again drops from an initial power level to a first pump power level, which in the present embodiment is zero. In any case, however, the first pump power level is lower than the second pump power level. In the embodiment shown, the first time instant 58 is actually prior to the drop of input signal power at time zero, i.e. it uses some sort of input delay, but the input delay is shorter than that of the ordinary "input delay control" represented by curve 52. In alternative embodiments, the first time instant 58 could also coincide with the drop in input power, i.e. correspond to time zero.

Like in the other control schemes, at a second time instant 60, the pump power is again set to the second pump power level. However, as is seen in FIG. 3, according to the "modulated pump power control", the pump power level is oscillated for a period of time starting after said first time instant 58 and ending prior to said second time instant 60. Herein, the oscillation frequency is 500 kHz and the amplitude is set to decrease continuously. In the present example, the period of oscillating pump power commences at around 14 μs, i.e. at a time where the "zero period" of the "zero period control" of the comparative example of FIG. 3 has already passed, and lasts for about 136 μs. In other words, the period of oscillating pump power occupies completely or at least for the most part the time period during which according to known types of pump power control, namely the "standard control" (graph 50), the "input delay control" (graph 52) or the "zero period control" (graph 54), the pump power level has already been set to the second pump power level.

FIG. 4 shows the gain variation versus time for the four controls shown in FIG. 3. For the different control schemes, the same line style as in FIG. 3 is used. Curve 50 shows the gain variations obtained for the standard control in solid line, the curve 52 shows the gain obtained by the "input delay control" in the dashed line and the curve 54 shows the gain obtained with the "zero period control" in the chain dotted line. For all prior art control schemes, values for control parameters yielding minimum magnitude of the gain variations have been chosen. Graph 56 shows the gain for the modulated pump power control in the further solid line. As is seen from FIG. 4, the deviation of the gain in positive direction, also referred to as "overshoot" in the following, is the smallest for the modulated pump power control of the invention. The modulated pump power control has a certain undershoot at short times, which is, however, still considerably smaller than the undershoot of the "input delay control" (graph 52). It is further seen that the overshoot of the gain for the modulated pump power is much smaller than that for the standard control (graph 50) or the "zero period control" (graph 54).

The advantageous behavior of the modulated pump power control can be explained as follows. The gain profile of an EDFA is substantially determined by the population probabilities of the involved energy levels. Denoting the population probability of the second or metastable level by $\overline{N}_{pop}^{2nd}$ and the population probability of the third or pump level by $\overline{N}_{pop}^{3rd}$, the gain profile of an erbium-doped fiber is described in linear units by $$G_{sig}^{lin} = \exp\{[(\sigma_{sig}^{a} + \sigma_{sig}^{e})\overline{N}_{pop}^{2nd}(t) - \sigma^{a}(1 - \overline{N}_{pop}^{3rd}(t))]L_{EDF}\}, \quad (1)$$

where $\sigma_{sig}^{a}$ and $\sigma_{sig}^{e}$ denote the wavelength dependent Giles parameters for absorption and emission at the wavelength of the signal. These two population probabilities are the only parameters in this equation that depend on time t. Thus, their evolution determines the transient behavior of the amplifier. Unfortunately, both parameters are coupled to the pump power and cannot be adjusted independently from one another. Large input signal power levels require larger pump powers as compared with small input signal power levels in order to keep the amplifier gain constant. Since large pump powers in general come along with larger population probabilities of the pump level, the population probability of the metastable level will change in case of a drop of channels. If the drop in input power is due to a breakdown of all incoming channels except for one "surviving" channel, resulting from equation (1), the gain of a single surviving channel at wavelength $\lambda_{surv}$ is not altered if the relation $$[\sigma^{a}(\lambda_{surv}) + \sigma^{e}(\lambda_{surv})]\Delta\overline{N}_{pop}^{2nd} = -\sigma^{a}(\lambda_{surv})\Delta\overline{N}_{pop}^{3rd} \quad (2)$$

is fulfilled, where $$\Delta\overline{N}_{pop}^{2nd}(t) = \overline{N}_{pop}^{2nd}(t) - \overline{N}_{pop}^{2nd}|_{before\ drop}$$

and $$\Delta\overline{N}_{pop}^{3rd}(t) = \overline{N}_{pop}^{3rd}(t) - \overline{N}_{pop}^{3rd}|_{before\ drop}$$

stand for the time dependent deviation of the population probabilities of the second or metastable level and the third or pump level, respectively, from the initial values. In other words, a linear relation between the variations of the two involved population probabilities is required to keep the gain of a single surviving channel constant.

When reducing the pump power synchronously to the drop of the input signal power, immediately less ions are excited to the pump level. Furthermore, the rate of transitions from the metastable level to the ground level also decreases abruptly. In contrast, the rate of the predominantly non-radiative transitions from the pump level to the metastable level decreases almost exponentially until the new state of equilibrium is reached. As a consequence, the population probability of the metastable level and the gain experience an overshoot.

Further insight into the feed-forward control is discerned from the parametric plot in FIG. 5. In FIG. 5, the horizontal axis denotes the variation of the population of the second level $\Delta\overline{N}_{pop}^{2nd}$, and the vertical axis denotes the variation in the population of the third level $\Delta\overline{N}_{pop}^{3rd}$. Accordingly, the point (0,0) corresponds to the initial populations, i.e. prior to the input signal power drop, which yields a desired gain value. The straight line 62 denotes pairs of population variations of the second and third level which would lead to the same gain value. Ideally, after the drop in input signal power, the pump power would be controlled such that the populations of the second and third levels would evolve along the line 62 until at point 64, final populations are reached, which lead to the same gain as initially, but with a reduced input power and hence reduced populations of the second and third levels. Any deviation to the right of the line 62 corresponds to an excessive population of the second level, or in other words, an "overshoot" in the gain. Conversely, any deviation to the left of the straight line 62 corresponds to a lack of population of the second level, and consequently an undershoot in the gain.

Again, the solid line 50 shows the evolution of populations for the standard control. At time zero, the curve 50 starts at point (0,0) in FIG. 5, where the input power decreases and the pump power is immediately set to the second pump power value. At small power levels, the amplifier dynamics is mainly determined by the lifetimes of the energy levels contributing to the signal amplification. The lifetime of the third level has been measured to be around 6.6 µs, whereas the lifetime of the second level amounts to about 10 ms. Because of this large difference, the third level is depopulated much faster than the second level. In fact, the pump level is depopulated quickly within the first about 20 µs. During this period, the population of the second state is increased by almost the same number as the population of the third level decreases. This is seen in FIG. 5, where the slope of the curve 50 moving away from point (0,0) is approximately −1, and hence to the right of line 62. This gives rise to a large overshoot in the gain that is also observed in FIG. 4.

The trace of the standard pump power control 50 shall next be compared with a trace of the "zero period control" 54. Thanks to the zero period, the change rate of $\overline{N}_{pop}^{2nd}$ becomes smaller as compared with $\overline{N}_{pop}^{3rd}$ already during the first microseconds and the configuration points are hence closer to the dashed line 62. For this reason, the overshoot is less than in the standard control, as is also apparent from FIG. 4.

With further reference to FIG. 5, the trace of the graph 52 for the "input delay control" can be understood as follows. In the "input delay control" the pump power drops before the input power drops. Accordingly, the population probability of the third level decreases relatively quickly. Since the input light has not dropped yet, the population of the second level is likewise depleted due to stimulated emission, and not adequately refilled due to the decreased pump power. At an operation point noted by 66, the input power drops too, and the further trace 52 is similar to that of the standard control, but shifted to the left in the diagram of FIG. 5, thereby avoiding the large overshoot. Note that around the operating point 66, the control will exhibit a substantial undershoot, which is also seen in FIG. 4, but this undershoot is still much less than the overshoot in the standard control.

It is further seen from both, FIG. 4 and FIG. 5, that each of the standard control, the standard "input delay" and "zero period control" lead to some undershoot, which is caused by the loss associated with the pump-bypass 42 of the amplifier setup 10 of FIG. 2. Undershoots are in fact limiting the efficiency of the combined "zero period" and "input delay control".

The trace 58 of the "modulated pump power" control according to the embodiment of the invention starts out as a combination of "input delay" and "zero period" control. In fact, starting out at point (0,0) in the diagram of FIG. 5, the pump power is dropped to zero at a time where the input power has not dropped yet, leading to a rapid decrease in the population probability of the third level and a less rapid drop of the population probability of the second level, similarly as in the "input delay" control (graph 52). However, note that the input delay is shorter than in case of the trace 52, which is why the trace changes its direction already at operating point 68. Further, unlike the "input delay" control, the pump power is reduced to a value that is lower than the second pump power level, and in this particular embodiment is zero (see FIG. 3). Accordingly, at the portion of the trace where the input power drop has already occurred, the slope of the trace 58 is steeper than that of the trace 52, because in absence of any pumping, the population of the third level decreases even more quickly.

Further, at a time of around 15 µs after the input power drop, the pump power is caused to oscillate with a frequency of about 500 kHz for a period of roughly 136 µs, as has been explained with reference to FIG. 3 above. The effect of this oscillation can be seen from the inset of FIG. 5 in which the portion of the parametric plot of FIG. 5 marked by a rectangle is shown in enlarged fashion. As is apparent from graph 54 in FIG. 4, turning off the pump for some time (zero period) leads to smaller positive deviations in $\overline{N}_{pop}^{2nd}$ from its final value, but at the same time results in larger undershoots. According to the present invention, these undershoots are reduced in order to allow to further diminish the maximum magnitude of the gain variations. As is apparent from the enlarged inset of FIG. 5, due to the oscillating pump power, small periodic increases of $\overline{N}_{pop}^{3rd}$ and $\overline{N}_{pop}^{2nd}$ close to their final values are introduced. This way, in the region of the graph of FIG. 5 encircled by the ellipse, the trace 58 is pushed in small steps to larger values of $\overline{N}_{pop}^{2nd}$ before moving to the final value, and the magnitude of the undershoot becomes smaller.

As compared to the optimum combined approach of "zero period" and "input delay" without oscillatory pump power, the magnitude of the gain variations could be reduced by 22% and equals 0.29 dB. With reference again to FIG. 4, the "modulated pump power approach" (graph 58) exhibits a first negative peak followed by a subsequent local maximum with some super-posed small fluctuations. This is followed by a moderate undershoot which is slightly larger than for the standard control 50, but small as compared with the ordinary "input delay" control 52 and "zero period" control.

Finally, FIG. 6 is a schematic block diagram representing the feed-forward control according to the "modulated pump power approach". This control is generally based on the standard feed-forward control (block 70), which determines a second pump power level corresponding to the new input power after the input power change. Further, a transient detection block 72 is provided for detecting a rapid change of input power. Then, using a block 74, a zero period and using a block 76, a periodic modulation of the pump power is introduced to the control. Herein, the periodic modulation is a sinusoidal modulation having a decreasing amplitude. Finally, in block 78, the pump power signal is "clipped" by a limiter 78 such as to avoid negative pump power values.

It is emphasized that the "modulated pump power control" as represented by reference sign 56 in FIG. 3 is only one exemplary embodiment, and that many variations are possible within the scope of the present invention. For example, FIG. 7 shows a control that can be regarded as a combination of the standard control and the oscillatory pump power. The pump power versus time is shown in the middle graph in FIG. 7. As is seen therein, at a first time instant (zero time), the pump power is changed from an initial pump power level to a new pump power level, which corresponds to the second pump power level, as is typical for the "standard control". However, different from the standard control, the pump power level is varied in an oscillatory manner for a period of time starting at a third time instant which is more than 100 µs after the first time instant and ending at a fourth time instant which coincides with the second time instant at which the pump power is set to and after which it is maintained at the second pump power level. Note that in the middle diagram of FIG. 7, the frequency of the pump power oscillation is again 500 kHz, so that the individual oscillations cannot be discerned in the time resolution of FIG. 7, so that this period appears like a solid cluster in the diagram. Again, the amplitude of the pump power oscillations decreases with time.

The left diagram of FIG. 7 shows a parametric plot of the variation of the population of the second and third energy levels of the gain medium obtained with the control according the middle diagram of FIG. 7, and the right diagram shows the corresponding gain variation versus time. As is seen in the right diagram, prior to the third time instant at which the oscillations in pump power start, the gain variation is similar to that of curve 50 of FIG. 4, as is to be expected. However, due to the oscillating pump power, the gain variation is increased, and the undershoot in the gain variation present in FIG. 4 can be avoided.

FIG. 8 shows similar plots as FIG. 7 in a related control. In the example of FIG. 8 too, no input delay and no zero period are used. However, instead of one long period with oscillating pump power, three consecutive periods of oscillating pump power are used. The effect of this control can be seen in the right diagram in FIG. 8: The gain variation is "pushed" in positive direction three times corresponding to the three periods of pump power oscillation, which again allows for avoiding any undershoot in gain, but at the same time avoids a further large over-shoot in the gain that was present in the example of FIG. 7.

FIG. 9 shows similar diagrams for a modified "zero period control" without input delay, but where a total of eight periods of oscillating pump power are introduced. After the last period of oscillating pump power, the pump power is maintained at the second value. In other words, each of the eight oscillating pump power intervals are prior to the "second time instant", at which the pump power is set to and kept at the second pump power level. In this example, the duration of the first oscillating pump power interval is larger than the duration of the other oscillating pump power intervals. As is seen from the right diagram in FIG. 9, using the eight periods of oscillating pump power, the undershoot observed for the "zero period control" 54 of FIG. 4 can be completely avoided.

FIG. 10 shows similar diagrams for a control which again employs a "zero period", but no input delay. More precisely, at time zero, the pump power is changed from its initial pump power level to a new pump power level, which in this example is zero. From a third time instant a little prior to 30 µs to a fourth time instant around 1000 µs, the pump power level is varied in an oscillatory manner. The fourth time instant corresponds to the second time instant at which the pump power is set to the second pump power level, in which it is then maintained. As is further seen, a small spike in the pump power is introduced between 10 and 15 µs. Again, as is seen from the right diagram in FIG. 10, the undershoot observed for the "zero period control" 54 of FIG. 4 can be reliably avoided.

As is seen from the previous examples, the control can be carried out in various manners. However, in all of these examples, the control starts with a change of the pump power from an initial pump power level to a new pump power level at a first time instant, where in the examples shown, the "new pump power level" could be zero as in FIGS. 9 and 10, or could correspond to the second pump power level, as in the case of FIGS. 7 and 8 but other "new pump power levels" are likewise conceivable. Further, at some point in time, referred to as the "second time instant" herein, the pump power is set to the second pump power level, at which the pump power is maintained, since the second pump power level is chosen to drive the amplifier gain to a predetermined gain value, for example the same gain value as prior to the change of input signal power. Inbetween these first and second time instances, one or more periods of oscillating pump power can be introduced which start at a third time instant and end a fourth time instant, where the third time instant is identical with or later than the first time instant and the fourth time instant is identical with or earlier than the second time instant.

Finally, FIG. 11 shows an alternative embodiment of the present invention, in which the pump power is not caused to oscillate. As is seen from the middle diagram of FIG. 11, at a first time instant, the pump power is changed from an initial pump power level to zero. This first time instant is at negative times, i.e. prior to the actual drop in input signal power. This embodiment hence makes use of an "input delay" too, but this is only optional. The pump power is kept at zero during a first time interval lasting a little longer than 15 µs. Then, the pump power is raised above the second pump power level during a second time interval. During the second time interval, the pump power is adjusted such as to monotonically converge to said second pump power level. At some point in time, the pump power reaches the second pump power level, which then corresponds to the "second time instant" according to the present disclosure. Note that a convergence to the second pump power level is regarded as a special case of a step of "setting the pump power to the second pump power level". For example, when the pump power has converged to the second pump power level to a range within e.g. 3% of the second pump power level, it can be said that the second pump power level has been reached and that the pump power has been "set to the second pump power level".

As is seen from the right diagram in FIG. 11, this alternative embodiment again allows for a very small variation of the gain. One advantage of the control of FIG. 11 is that it is not necessary to actively cause the oscillations in the pump power, which allows for a very cost efficient implementation. In fact, as will be explained with reference to FIG. 12, the control of FIG. 11 can be effected without any DSP or the like, but simply employing suitable filters, as indicated in FIG. 12.

As shown in FIG. 12, in addition to the standard feed-forward control block 70 and the limiter 78, a control block 79 is used including an all pass filter 80, a first high pass filter 82, a delay element 84 and a second high pass filter 86. The signal $S_1$ representing the signal input power (see FIGS. 1 and 2) is inputted in each of the all pass filter 80, the first high pass filter 82 and the delay element 84. Once an abrupt change in input signal power signal $S_1$ occurs, this leads to a large output at the first high pass filter 82. Since the output of the first high pass filter 82 is subtracted from the other signals, the total signal entering the limiter 76 will be negative hence leading to a zero output of the limiter 76, thereby effecting the zero period that can be seen in the middle diagram of FIG. 11.

The rapid change in the amplitude of the input signal power signal $S_1$ will also lead to a positive output peak at the second high pass filter 86, but delayed by a time period defined by the delay unit 84, which effectively determines the denotation of the zero period. This delayed positive peak will cause a control signal for the pump device that leads to the pump power exceeding the second power value, as again seen in the middle diagram of FIG. 11. As the positive peak decays in time, the pump power converges to the second power level. Of course, these filter functions can also be combined in a single transfer function.

The embodiments described above and the accompanying figures merely serve to illustrate the method according to the present invention, and should not be taken to indicate any limitation of the method. The scope of the patent is solely determined by the following claims.

10 amplifier setup
12 arrangement comprising erbium-doped fiber coils and passive components
14 input of arrangement 12
16 output of arrangement 12
18 pump light input
20 pump-light source
22 first power splitter
24 first optical-electrical converter
26 delay line
28 feed-forward control unit
30 second power splitter
32 second optical-electrical converter
34 feedback control unit
36 adder
38 coils of erbium-doped fibers
40 optical isolator
42 pump bypass
44 further wavelength selective couplers
46 wavelength selective coupler
48 further isolator
50 solid curve
52 dashed line
54 chain dotted line
56 solid curve
58 first point in time
60 second point in time
62 straight line
66 operation point
68 operating point
70 standard feed-forward control block
72 transient detection block
74 block introducing zero period
76 modulation block
78 limiter block
79 control block
80 all pass filter
82 high pass filter
84 delay element
86 second high pass filter

The invention claimed is:

1. A method of controlling a gain of an optical amplifier comprising a gain medium and at least one pumping device, said method comprising the following steps:
determining or predicting a change of input signal power to the amplifier,
changing a pump power from an initial pump power level to a new pump power level at a first time instant, the initial pump power level being the pump power level applied to the amplifier prior to the change in input signal power,
setting the pump power to a second pump power level at a second time instant, characterized in that
the pump power level is varied in an oscillatory manner for at least one period of time starting at a third time instant and ending at a fourth time instant, wherein said third time instant is identical with or later than said first time instant and said fourth time instant is identical with or earlier than said second time instant.

2. The method of claim 1, wherein the time-average value of oscillating pump power exceeds the second pump power level.

3. The method of claim 1, wherein an amplitude of the pump power level oscillation decreases with time.

4. The method of claim 1, wherein the second pump power level is chosen to drive a gain of the amplifier to a predetermined gain value, wherein said predetermined gain value preferably coincides with a gain value prior to the change in input signal power.

5. The method of claim 1, wherein
the change of input signal power comprises a drop of input signal power,
the second pump power level is smaller than said initial pump power level, and
the pump power is kept at or below a first pump power level for a period of time starting at or after said first time instant and ending prior to or at the third time instant, wherein said first pump power level is equal to or smaller than said second pump power level, and in particular zero.

6. The method of claim 1, wherein
the change of input signal power comprises an increase of input signal power,
the second pump power level is larger than said initial pump power level, and
the pump power is kept at or above a first pump power level for a period of time starting at or after said first time instant and ending prior to or at the third time instant, wherein said first pump power level is larger than said second pump power level.

7. The method of claim 1, wherein said first time instant coincides with the change of input signal power.

8. The method of claim 1, wherein said first time instant occurs prior to a time at which the input signal power to the amplifier has changed by 50% of a total of the change in input signal power.

9. The method of claim 8, wherein the input signal power is monitored at a location that is separated from a gain medium of the amplifier by an optical delay element.

10. The method of claim 1, wherein the at least one pumping device has an emission wavelength of 980 nm+/− 10 nm.

11. A method of controlling a gain of an optical amplifier comprising a gain medium and at least one pumping device, said method comprising the following steps:
determining or predicting a change of input signal power to the amplifier,
changing a pump power from an initial pump power level to a new pump power level at a first time instant, the initial pump power level being the pump power level applied to the amplifier prior to the change in input signal power,
setting the pump power to a second pump power level at a second time instant, characterized in that
in case the change of input signal power is a drop in input signal power,
the pump power is kept at or below a first pump power level during a first time interval starting after said first time instant, wherein said first pump power level is lower than said second pump power level, and in particular zero, and
the pump power is raised above said second pump power level during a second time interval, said second time interval starting after said first time interval has ended and ending at or prior to said second time instant, and/or in case the change of input signal power is an increase in input signal power, the pump power is kept above a first pump power level during a first time interval starting after said first time instant, wherein said first pump power level is larger than said second pump power level, and the pump power is kept below said second pump power level during a second time interval, said second time interval starting after said first time interval has ended and ending at or prior to said second time instant.

12. The method of claim 11, wherein during said second time interval, the pump power is adjusted such as to monotonically converge to said second pump power level.

13. An optical amplifier arrangement, comprising:
at least one pumping device, and
a control unit for controlling a pump power of said at least one pumping device,
wherein said control unit is configured
to determine or predict a change of input signal power to the amplifier, or to receive information regarding such change of input signal power,
to change the pump power from an initial pump power level to a new pump power level at a first time instant, said initial pump power level being the pump power level applied to the amplifier prior to the change in input signal power, and
to set the pump power to a second pump power level at a second time instant, characterized in that the control unit is further configured to vary the pump power level in an oscillatory manner for a period of time starting at a third time instant and ending at a fourth time instant, wherein said third time instant is identical with or later than said first time instant and said fourth time instant is identical with or earlier than said second time instant,
wherein said control unit is preferably further configured to carry out a method of controlling the gain of the optical amplifier according to claim 1.

14. An optical amplifier arrangement, comprising:
at least one pumping device, and
a control unit for controlling a pump power of said at least one pumping device,
wherein said control unit is configured
to determine or predict a change of input signal power to the amplifier, or to receive information regarding such change of input signal power,
to change the pump power from an initial pump power level to a new pump power level at a first time instant, said initial pump power level being the pump power level applied to the amplifier prior to said change in input signal power, and
to set the pump power to a second pump power level at a second time instant, characterized in that
said control unit is configured to control the pump power such that:

in case said change of input signal power is a drop in input signal power, the pump power is kept at or below a first pump power level during a first time interval starting after said first time instant, wherein said first pump power level is lower than said second pump power level, and in particular zero, and the pump power is raised above said second pump power level during a second time interval, said second time interval starting after said first time interval has ended and ending at or prior to said second time instant, and/or in case said change of input signal power is an increase in input signal power, the pump power is kept above a first pump power level during a first time interval starting after said first time instant, wherein said first pump power level is larger than said second pump power level, the pump power is kept below said second pump power level during a second time interval, said second time interval starting after said first time interval has ended and ending at or prior to said second time instant.

15. The optical amplifier of claim 14, wherein the amplifier comprises two rare earth doped fiber-lengths, particularly erbium doped fiber lengths, separated by an optical isolator and comprising a pump bypass allowing the pump-light to bypass said isolator, or a splitter for splitting the light of the pumping device for introduction in the individual fiber lengths.

* * * * *